INVENTOR:
KIYOSHI INOUE
BY
Karl F. Ross
Attorney

United States Patent Office 3,424,889
Patented Jan. 28, 1969

3,424,889
RESISTANCE WELDING APPARATUS AND
METHOD
Kiyoshi Inoue, No. 182, 3-chome, Tamagawayoga-Machi,
Setagaya-ku, Tokyo-to, Japan
Continuation-in-part of application Ser. No. 244,798,
Dec. 14, 1962. This application Oct. 23, 1965, Ser.
No. 503,677
Claims priority, application Japan, Dec. 14, 1961,
36/45,550, 36/45,551; Aug. 10, 1962, 37/33,022;
Sept. 29, 1962, 37/42,502; Nov. 30, 1962,
37/71,415
U.S. Cl. 219—112          7 Claims
Int. Cl. B23k 9/06, 11/26

ABSTRACT OF THE DISCLOSURE

A welding apparatus and method in which a transformer has a secondary winding applying welding pulses across a pair of electrodes and a primary winding energized by a low-frequency or pulsating (discharge) source, the primary winding having a plurality of steps each bridged by a respective capacitor forming a resonant network therewith. A biasing network containing an inductor is connected across the primary winding in such direction as to reduce residual flux and increase the rate of change of the magnetic flux ($d\varphi/dt$).

Figure 1:
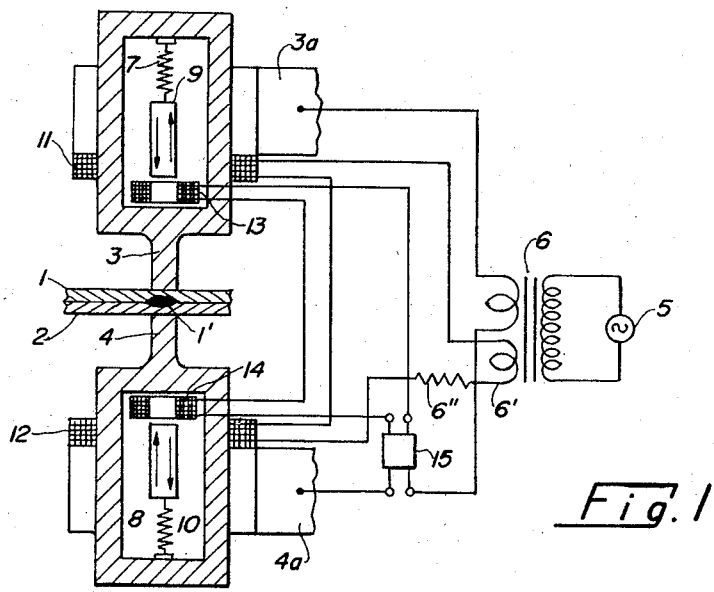

This application is a continuation-in-part of the copending application Ser. No. 244,798, filed Dec. 14, 1962, now U.S. Patent No. 3,236,996 of Feb. 22, 1966.

My present invention relates to an improved fusion welding apparatus of the general type wherein two electrically conductive bodies are welded together along an interfacial zone under pressure applied between a pair of electrodes, each of which engages one of the bodies.

Apparatus of this type disclosed in my Patent No. 3,060,306, issued Oct. 23, 1962. The structure shown in this patent is only representative of most hitherto existing types of spot-welding, lap-welding, seam-welding and metal cladding machines operating upon the resistance-heating principle. In all such apparatus the two bodies are clamped between the electrodes under spring or mechanical pressure for the duration of the welding. Generally, the clamping force is derived from the potential energy of a force-storing member such as the aforementioned spring or is continuously applied via levers having mechanical advantages and force-transmitting capabilities. These known welding machines were frequently characterized by a low efficiency deriving from the fact that the welding transformer often had a high inherent residual flux which lowered its output and required considerably higher input currents to overcome the effect of the residual flux. Moreover, there usually were difficulties in matching the system impedance to the load, especially where the transformer parameters were determined by the other factors such as the input and output voltages and the KVA requirements.

It is an object of the present invention to provide an improved fusion welding apparatus wherein the aforementioned disadvantages are obviated.

A further object of the invention is to provide a welding circuit wherein the negative effects of residual flux can be reduced or eliminated. A corollary object is to realize the reduction of residual flux in any transformer circuit operating at low frequencies.

Another object is to provide an improved system of the character described wherein the pulse width of the transforming output, heretofore determined by the residual-flux and residual-charge characteristics of the transformer, can be reduced.

The welding apparatus as recited in copending application Ser. No. 244,798 may comprise a pair of juxtaposed electrodes, relatively displaceable toward and away from each other, and pressure means for intermittently displacing the electrodes to urge the bodies toward each other at an interfacial zone at which welding is to be carried out; a circuit means is connected across the electrodes for passing an electric current having a peak value through the bodies at this interfacial zone while a control means is coupled with the circuit means for delaying passage of at least of the peak current until the pressure means has biased the electrodes against the bodies. The pressure means includes an impacting member which is displaceable independently of at least one of the electrodes but is in force transmitting relationship therewith to apply the kinetic energy of this member to the electrode. Thus, the two bodies are clamped together under the effect of the kinetic energy of a moving member rather than by a spring or the consistently applied force of conventional clamping arms. While the member may comprise any relatively massive reciprocating body, which can be displaced with the aid of mechanical and electrical means (e.g. hydraulic or pneumatic cylinders or electric motors), it is preferred to employ an electromagnetic solenoid as a power means for applying the body to the electrode. This solenoid will be operated in conjunction with oscillating means for continuously reciprocating the body so that it need only apply a biasing force to bring the rapidly moving member into contact with the electrode. The power means and the magnetic oscillating means may, conveniently, be incorporated in a control or timing circuit which maintains the energization of the power means in phase with the oscillations of the member.

According to the principal feature of this invention, the resistance-welding apparatus comprises a circuit means which includes a transformer, generally operating at relatively low frequencies up to, say, 100 cycles per second, which sustains a residual flux capable of reducing its output, and compensating means connected across the transformer means for reducing this flux. The transformer circuit may, consequently, have a primary winding connected across the source of preferably pulsating D.C. or low-frequency A.C. current and a secondary winding connected across a load with the core inductively coupling the two windings. The compensating means can thus be included in circuit with the primary winding and may include capacitive means bridging at least part of this winding to form therewith a resonant circuit capable of improving the wave form of the pulses delivered to the welding electrode. If reference is made to the hysteresis characteristics of the transformer, it will be seen that the initial flux variation, upon current flow, proceeds to the maximum flux density ($B_m$) and field strength ($H_m$) along a curve other than that of the closed hysteresis loop. The system of this invention provides a temporary reverse or negative magnetization whereby the initial flow of current of the welding pulse can cause the magnetization to proceed along the closed loop. Thus a greater electromotive force is obtained by use of the full range of the hysteresis curve since the negative side thereof is also exploited even when D.C. pulses are employed.

A more particular feature of the invention resides in the provision of a compensating means which includes a biasing network bridging the primary winding for applying a biasing current thereto in such direction as to nullify the residual flux and permit use of the full range of the hysteresis curve as indicated above. This network advantageously includes an inductively reactive circuit element which shapes the biasing wave and may also include a load resistor. The network is preferably energized by a source of pulsating direct current connected across this resistor.

3

Figure 4:
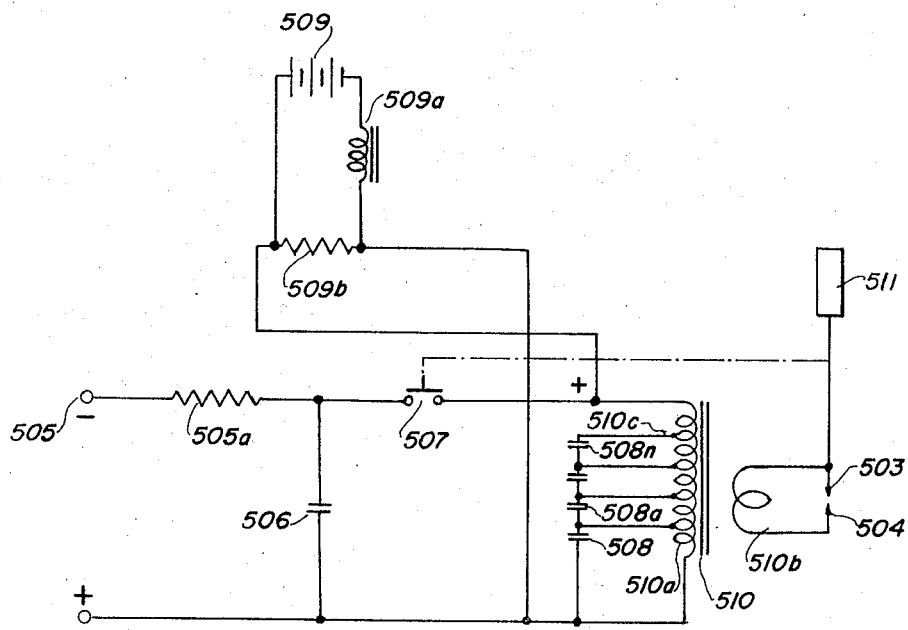
Figure 2:
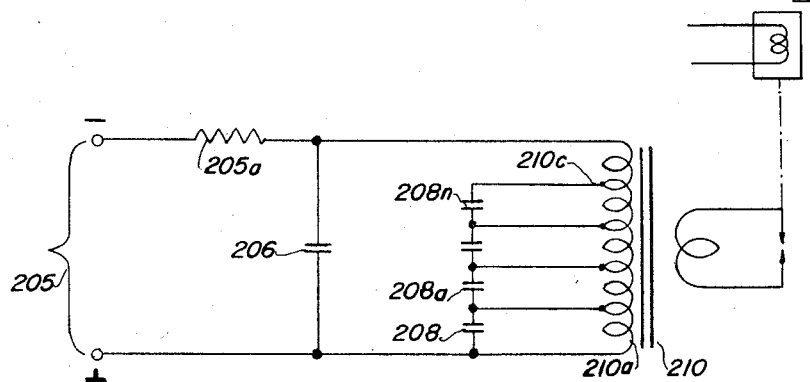
Figure 3:
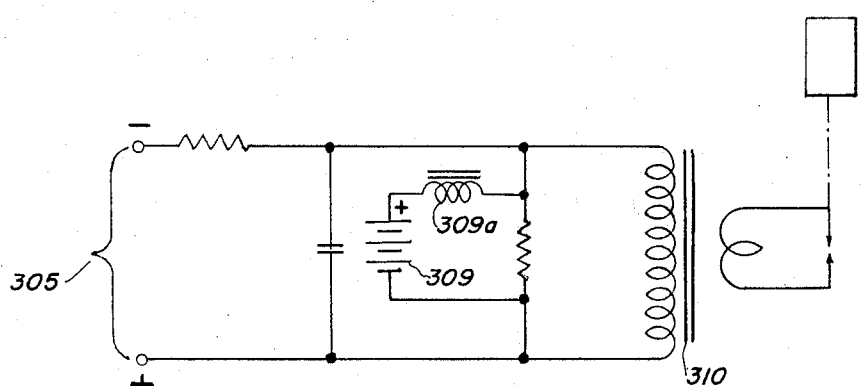

The above and other objects, features and advantages of the invention will become more readily apparent from the following detailed description, reference being made to the accompanying drawing in which:

FIG. 1 is a cross-sectional view through the welding heads of a spot welder with the control circuit therefor shown schematically; and FIGS. 2–4 are diagrams of circuit arrangements for transformer systems suitable for use with the welding device.

In FIG. 1 I shows a device for spot welding two plates 1 and 2 together along their interfacial zone 1' with the aid of a pair of electrodes 3 and 4 which bear slightly against these bodies and are mounted upon respective arms 3a, 4a resiliently displaceable toward and away from the plates. The conductive arms 3a, 4a are connected across the secondary winding of a transformer 6 via a timing and switch circuit 15 which is described in application Ser. No. 244,798. The transformer 6 is energized via a periodic (alternating) current source 5 of low frequency which is bridged across the primary winding. While only the A.C. source is illustrated in FIG. 1, it will be understood that any of the primary systems of FIGS. 2–4 is used with the transformer 6. The welding heads 3, 4 are each hollow and contain a vibrating magnetically permeable impacting member 9, 10 resiliently mounted upon springs 7, 8, respectively, and oscillated in phase with the transformer input by coils 11 and 12 connected in series with a further secondary winding 6'. A resistance 6" in this circuit is intended to indicate the line resistance. The power means for driving the impacting members 9 and 10 is constituted by a pair of solenoids 13, 14 which are coupled with the transformer 6 via a timing circuit 15b (FIG. 2). The solenoids 13 and 14 are fixed within the heads 3 and 4, respectively. In operation, the impact bodies 9, 10 are vibrated in phase with the welding current via coils 11, 12 and are thus not at rest with considerable inertia but can be periodically applied to the welding electrodes 3, 4 by solenoids 13, 14 to transfer all of their kinetic energy to these electrodes and clamp the bodies 1 and 2 together. Immediately thereafter, the welding current is passed through these electrodes to fuse the bodies together in their interfacial zone. Current thus passes through the solenoids 13 and 14 to apply the members 9 and 10 to the electrodes 3 and 4 in order to clamp the bodies 1 and 2 together. Immediately thereafter, the main welding circuit is completed to the electrodes 3 and 4. Thus, the welding current passes through the electrodes after they have been clamped against the bodies by the impact members so that sparking is avoided.

In FIG. 4 I have shown a circuit suitable for use in the welding device previously described (FIG. 1) and capable of limiting or eliminating residual flux which frequently reduces the output of such transformers below acceptable levels. A direct-current source 505 is connected in series with the line resistance 505a across a capacitor 506 and in series with a switch 507 across the primary winding 510a of a transformer 510 whose secondary winding 510b energizes the electrodes 503, 504 of a welding device. The impacting elements (not shown) for applying these electrodes to the workpiece are energized by a timing circuit 511 which also closes the switch 507 to energize the primary winding after the bodies have been clamped between the electrodes; the switch 507 thus synchronizes the welding-current pulses with the electrodes. When the terminals of this direct-current source 505 are poled as indicated on the left-hand side of FIG. 4, the welding action takes place so that a residual flux develops in the core of the transformer, thereby reducing the efficiency of the latter and the load current. To obviate this effect, I provide a compensating system comprising a current source so poled as to counteract the residual flux. The current source may include a battery 509 in series with a choke 509a across a load resistor 509b. It will be apparent, therefore, that the impulsive flux passing through the transformer 510 when the compensating network is connected, has an increased rate of change $d\varphi/dt$ following the closed hysteresis loop from the negative side (reverse magnetization produced by the compensating network) to $B_{max}$. The welding power can thus be increased without exceeding the capacity of the transformer.

A concurrent method of dissipating the residual flux, as will be described below with reference to FIG. 2, is to provide capacitive means forming a resonant network with part of the primary winding 510a. Thus, the latter may be provided with a plurality of taps 510c each pair of which is bridged by a respective capacitor 508, 508a, . . . 508n. The resonant network has a characteristic frequency substantially higher than the low frequency of source 505 so that dissipation of the residual flux can be carried out.

While the several flux-abating systems have been shown to be alternatively or concurrently effective in the arrangement of FIG. 4, it will be understood that, generally, they will be employed in practice independently. Thus, in FIG. 2, a high-power direct-current source can be connected across the transformer primary 210 via the pulse-generating R-C network comprising the resistor 205a and the capacitor 206, the latter being bridged across the primary winding 210a of the transformer 210 where the transformer and capacitor 206 are mismatched. When an A.C. source is applied at 205, the resistance 205a will represent the line resistance. In both cases, the primary winding 210a and the capacitor 206 will constitute a resonant network whose characteristic resonance frequency differs from the desired pulse or A.C. frequency. The capacitors 208, 208a . . . 208n, bridged across respective sections of the primary winding 210a via the taps 210c, thus serve to eliminate the mismatch of the capacitor 206 with the primary winding so that the effective inductive impedance as seen by the capacitor 206 is so matched with the reactive impedance of the latter to ensure that the characteristic frequency of the resonant network thereby constituted is approximately that of the desired pulses. Furthermore, this arrangement in the systems of FIGS. 2 and 4 guarantees the dissipation of any residual charge remaining in the capacitor, thereby resulting in a shortening of the pulse width. Such shortening is especially desirable in spot-welding applications and the like.

As indicated in FIG. 3, the battery 309, in series with a choke 309a, is poled oppositely to the higher-power source connected across the terminals 305 and is applied to the transformer primary 310 across the load resistor 309b, thereby eliminating the residual magnetism of the transformer core after the welding pulse has been applied.

The invention herein described and illustrated is believed to admit of many modifications within the ability of persons skilled in the art, all such modifications being deemed included within the spirit and scope of the invention as defined in the appended claims.

I claim:

1. In a welding apparatus, a transformer circuit for generating welding pulses comprising a source of electric current; a transformer having a primary winding connected across said source, a secondary winding connected across a load, and a core inductively coupling said windings and capable of sustaining a residual flux; and compensating means in circuit with said primary winding for reducing said residual flux and increasing the rate of change of magnetic flux $(d\varphi/dt)$ in said core, said compensating means including capacitive means connected across part of said primary winding and forming with said part of said primary winding a resonant circuit, said primary winding being provided with a plurality of taps, said capacitive means including a plurality of capacitors each connected across a pair of said taps.

2. A circuit as defined in claim 1 wherein said compensating means further includes a biasing network bridging said primary winding for applying a biasing current thereto in such direction as to nullify said residual flux and increasing the rate of change of magnetic flux $(d\varphi/dt)$.

3. A circuit as defined in claim 2 wherein said network includes an inductively reactive circuit element in series with said source.

4. A circuit as defined in claim 3 wherein said network includes a load resistor and a source of direct current connected across said resistor.

5. In a welding apparatus having electrode means for applying a welding current to a workpiece, and a step-down transformer having a primary winding energizable with a source of pulsating current and a secondary winding connected to said electrode means, the improvement which comprises a capacitor connected across said primary winding between said source and said transformer, said primary winding having a multiplicity of taps and a plurality of condensers each connected across only part of said primary winding and forming a resonant network with said part, said condensers respectively bridging said taps in pairs.

6. In a method of welding a workpiece whereby a succession of welding pulses are applied thereto by electrode means energized by a step-down transformer having a secondary winding connected to said electrode means and a multiple-tap primary winding bridged by a capacitor energized by a pulsating-current source, the improvement which comprises the step of decreasing the pulse width arising from said capacitor by bridging only part of the primary winding with a plurality of condensers bridging the taps thereof in pairs to form resonant networks with the portions of the primary winding bridged by each of said condensers.

7. In a welding apparatus having electrode means for applying a welding current to a workpiece, and a step-down transformer having a primary winding energizable with a source of pulsating current and a secondary winding connected to said electrode means, the improvement which comprises:
  a capacitor connected across said primary winding between said source and said transformer; and
  a biasing network connected across said primary winding for applying a biasing current thereto in such direction as to nullify residual flux in said step-down transformer, said primary winding being provided with a plurality of taps, a plurality of condensers each being connected across a pair of said taps and forming resonant networks with the respective portion of the primary winding between the taps bridged by the respective condenser, said biasing network including a load resistor connected across said primary winding, a source of direct current and an inductively reactive circuit element connected in series with one another across said load resistor.

References Cited
UNITED STATES PATENTS

| | | | |
|---|---|---|---|
| 2,319,215 | 5/1943 | Dawson | 219—113 |
| 2,440,247 | 4/1948 | Dawson | 323—58 |

RICHARD M. WOOD, *Primary Examiner.*

J. G. SMITH, *Assistant Examiner.*

U.S. Cl. X.R.

1—89; 219—91, 116; 323—45